Jan. 4, 1966  H. M. BEKKERING ET AL  3,227,539
APPARATUS FOR WORKING GLASS TUBING
Filed Dec. 12, 1961  6 Sheets-Sheet 1

INVENTOR
HENDRIK M. BEKKERING
CORNELIS STAPEL
BY  FREDRIK B. J. WIEGMAN
AGENT

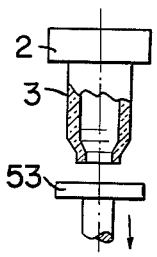
FIG. 3
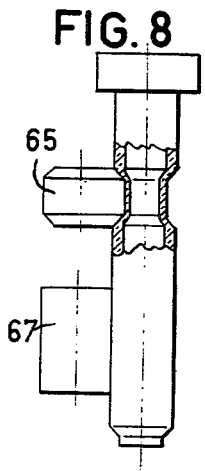
FIG. 8
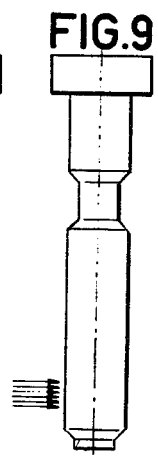
FIG. 9
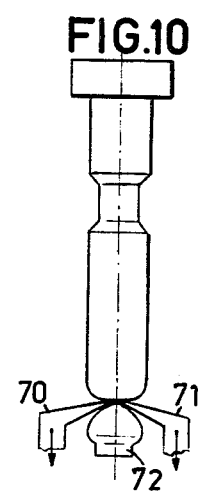
FIG. 10
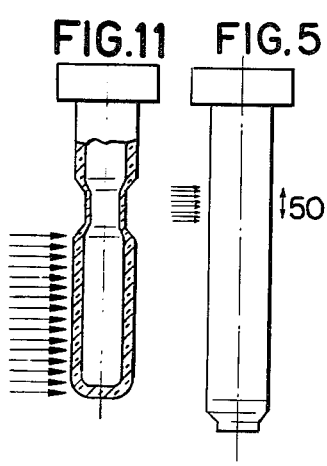
FIG. 11　FIG. 5
FIG. 12
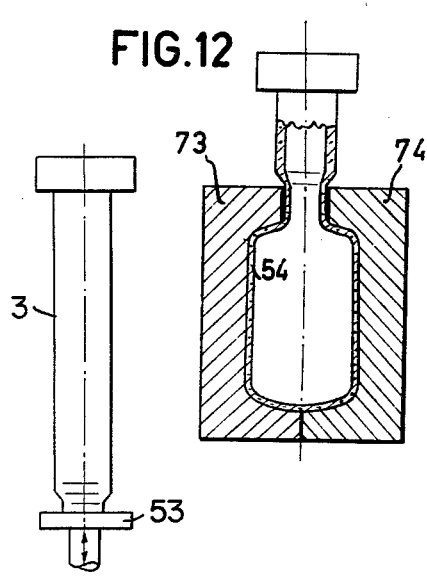
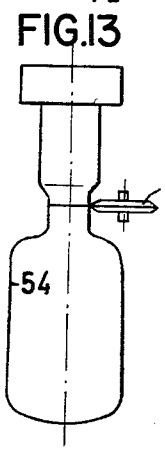
FIG. 13
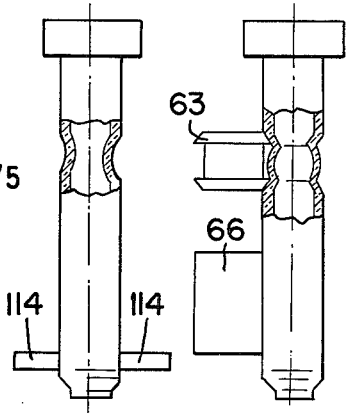
FIG. 6　FIG. 7
FIG. 4

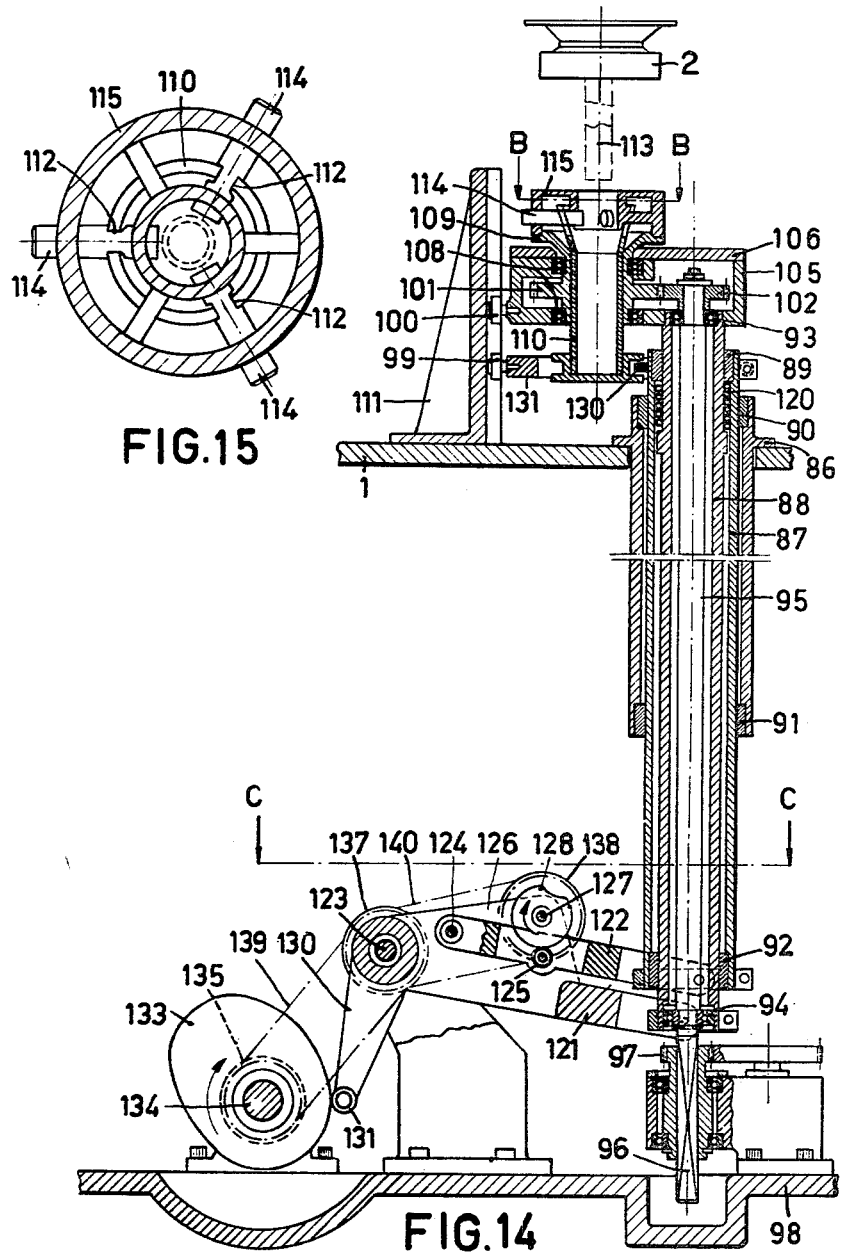

Jan. 4, 1966     H. M. BEKKERING ET AL     3,227,539
APPARATUS FOR WORKING GLASS TUBING
Filed Dec. 12, 1961     6 Sheets-Sheet 4

INVENTOR
HENDRIK M. BEKKERING.
CORNELIS STAPEL.
BY FREDRIK B.J. WIEGMAN.
AGENT 3,227,539
APPARATUS FOR WORKING GLASS TUBING
Hendrik Mattheus Bekkering, Cornelis Stapel, and Fredrik Berend Jan Wiegman, all of Emmasingel, Eindhoven, Netherlands, assignors to North American Philips Company Inc., New York, N.Y., a corporation of Delaware
Filed Dec. 12, 1961, Ser. No. 158,698
Claims priority, application Netherlands, Jan. 3, 1961, 259,677
2 Claims. (Cl. 65—292)

Glass tubing is frequently used as initial material for manufacturing mass products from glass, for example light bulbs. In the machines used for working this glass tubing, the tube is subjected to a number of standardized operations after being softened by heating. One of these operations comprises the process of forming the closed lower end of a heated length of glass tubing into a bulb by blow moulding. Another operation consists in drawing out a discrete portion of the length of glass tubing by means of two holders moving away from one another. Another such operation is the so-called rolling of the drawn length of glass tubing, in which a rotation-symmetrical rotary shaping member, for example a shaping roller, is pressed against the drawn and softened length of glass tubing. These operations permit or provide an accurately profiled surface at the rolling area.

For working glass tubing glass working machines are known, in which the length of glass tubing to be worked generally describes a circular path while being held by an upper and a lower holder. In machines of the known kind, both the upper holders and the lower holders continually rotate in a circular path and simultaneously are driven synchronously so that the tubing parts gripped in the upper and lower holders remain in alinement. Such machines are comparatively heavy and expensive. For shaping a part of the glass tubing which is situated between an upper and lower holder and which is softened by heating, by a rolling operation, the shaping members of these machines have to follow, at least partially, the path described by the continuously travelling holders. This requires a mechanism which is highly complicated. The same applies to the burners in such machines, which also have to follow, at least partially, the movement of a length of tubing held between an upper and a lower holder.

It is the object of the present invention to provide a machine which is relatively uncomplicated by comparison with the known machines and in which the said disadvantages are mitigated.

According to the invention, a machine for working glass tubing, comprises a number of holders, each one gripping a length of glass tubing to be worked and which are capable of travelling along a path and of revolving about their axes, a number of rotation-symmetrical rotary shaping members, which are disposed below the said holders, for reducing the diameter of a discrete portion of the length of glass tubing projecting from each holder and locally softened by heating, and associated members for centering the lower end of such a length of glass tubing. Said machine is characterized in that the holders are capable of intermittent movement along a path including at least one position in which the shaping and centering members are enabled to co-operate with the length of glass tubing projecting from a holder during a stationary period, the shaping members comprising at least three forming rollers arranged about the tubing and capable of simultaneous movement towards the tubing, the centering members comprising at least three members, which are disposed below the shaping members and are also capable of simultaneous movement towards the tubing, the centre lines of the forming rollers extending parallel to the centre line of the tubing to be worked, whilst the forming and centering members when not in engagement with the tubing are positioned so as to permit the holders and the tubing to move to the next position.

An essential element of the machine according to the invention consists in that, in contradistinction to the known machines, this machine is designed so that the holders travel along a path intermittently, that is to say, discontinuously. Consequently, in the path of the holder, moving periods alternate with rest periods. These rest periods, in which the holders may obviously keep revolving about their axes, enable the forming members concerned to approach the length of glass tubing to be worked, to perform their shaping action when stationary and to move away on termination of this operation, while the holder and the length of glass tubing are still in the same position. Thus, these forming members are stationary and of much simpler operation and economical design.

A further important element of the invention consists in that it enables each length of glass tubing being worked to be gripped principally by the upper holder only. When the glass tubing is shaped by rolling, the required centering of its lower end projecting from the holder is effected by the said centering members, which are combined with the rotary shaping members. The fact that the length of glass tubing being worked in the machine is principally gripped by a single holder provides the advantage that in another position the lower end of this length is readily accessible. This is of advantage, for example, in closing the lower end of the length of glass tubing by an operation which generally succeeds the rolling operation, and also in forming this end into, for example, a filament lamp bulb with the aid of a mould which, in a later position along the path, encloses said lower end.

It will be appreciated that by the use of the present invention one may arrive at a very compact universal machine, in which a softened part of a length of glass tubing gripped by a holder may be subjected to widely different operations. Hence, the machine is particularly suited to the mass production of glass articles, such as filament lamp bulbs and the like, from long lengths of glass tubing.

A further advantage of the machine consists in that the shaping members acting upon the softened glass tubing are accurately adjustable because they are stationary. It is further to be considered as an advantage of the machine according to the invention that it is simply and quickly adjustable to changes in the shape of the article to be manufactured. If, for example, the machine were originally used for manufacturing a certain type of bulb and subsequently for another type of slightly different shape, in all probability the bulb moulds only would have to be exchanged, without the adjustment of the shaping and centering members being altered.

In a preferred embodiment of the apparatus according to the invention, a shaping roller and a centering member below the roller are mounted on a common support, their movement in the direction of length of the tubing being controllable so that the shaping member can be caused to move into the tubing part softened by heating to a required depth, while the centering member remains spaced from the centre line of the tubing by a required distance. This controllability may be readily effected owing to the fact that the change in shape of the tubing diameter takes place during a stationary period and hence in a fixed position with respect to the path.

In a further embodiment of the apparatus according to the invention, each support comprises two arms capable of pivoting about a common vertical shaft, one arm carrying the shaping member and being capable of being moved, through an angle determined by the angular displacement of this shaft, towards the tubing part to be worked, while the arm carrying the centering member is resiliently connected to the first arm and can only be moved towards the tubing to be worked through a distance determined by a preferably adjustable stop. This embodiment materially simplifies the control of the movements of the shaping member and the lower centering member, for pivotal movement of the arm carrying the shaping member through a preferably adjustable angle permits of simultaneous control of the shaping member and the centering member. The three rotary shaping members which may be present in a shaping position can simply be moved simultaneously towards the tubing to be shaped by providing each shaft about which the arms carrying the shaping members pivot with a pinion, the pinions being revolved simultaneously by one gear-wheel.

By the local reduction of diameter of a tubing part softened by heating, whi h reduction is effected by rolling, the wall thickness at this site becomes greater than that of the initial tubing. If the contraction of the diameter is great, this may cause a comparatively large increase of the wall thickness at the constriction. If this is undesirable or the wall thickness of the constriction should be less than that of the initial tubing, a method may be used in which the tubing part softened by heating is first drawn out axially, so that the wall thickness of this portion is reduced. Then the diameter of the drawn tubing part may be imparted the desired value by impressing at least one shaping roller. Such a method comprising drawing out and subsequent rolling may be simply performed in an apparatus according to a further embodiment of the invention. In this apparatus, means for reducing the wall thickness of a length of glass tubing, which is softened by heating, by a drawing operation are disposed, when viewed in the direction of movement of the holders along their path, in front of the position or positions (FIG. 1) in which the shaping and centering members are arranged, the said means comprising a vertically movable drawing member which can be controlled so that a length of glass tubing projecting from a holder is gripped at its end, axially moved and then released.

A final embodiment of the apparatus comprises, viewed in the direction of travel of the holders along their path, after the positions at which the shaping and centering members are disposed, a number of further positions in which means are provided for softening the lower end of the length of glass tubing by heating and closing it, for softening by heating the portion of the tubing below the rolled part and forming it into a bulb in a hollow split mould, and for severing the worked part from the unworked part of the tubing.

In the position where the hollow split mould is disposed, the shape of the previously constricted tubing part is not changed any more.

In order that the invention may readily be carried out, an embodiment of the invention will now be described, by way of example, with reference to the accompanying diagrammatic drawings, in which:

FIGURES 1 and 2 are a plan view and a side elevation respectively, of the principal parts of an apparatus for working glass tubing according to the invention. FIGURE 2 is an elevation taken according to an arrow A of FIGURE 1.

FIGURES 3 to 13 relate to the various successive operations performed by the apparatus according to the invention.

FIGURE 14 shows the mechanism of the apparatus according to the invention for reducing, by drawing, the wall thickness of a tubing part softened by heating.

FIGURES 15 and 16 are sectional views taken along lines B—B and C—C of FIGURE 14, respectively.

Figure 18:
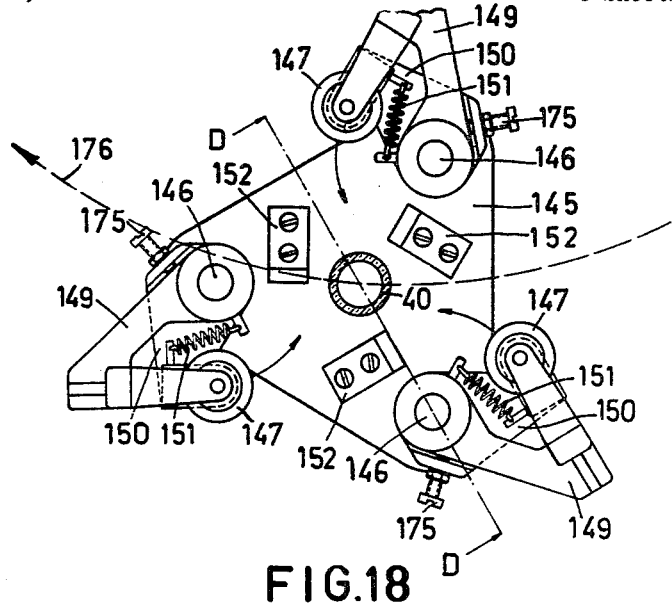
Figure 20:
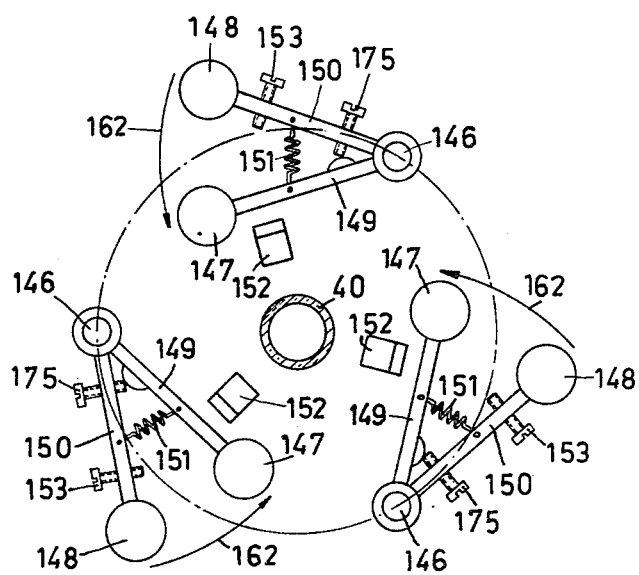
Figure 19:
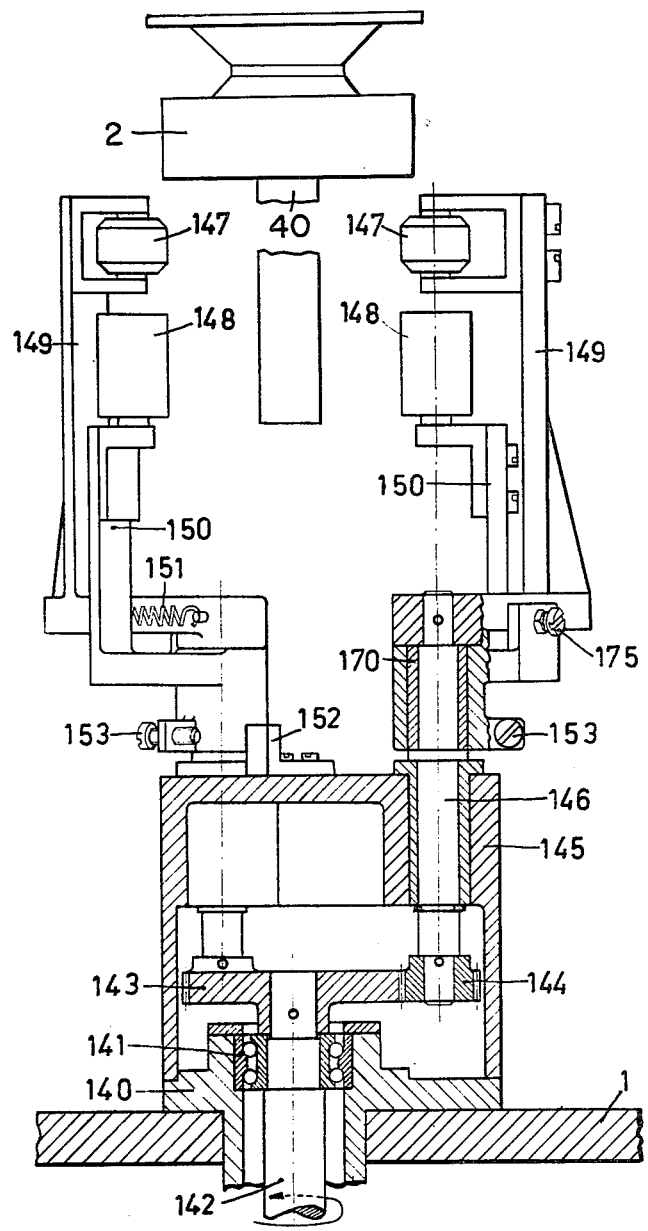

FIGURE 18 is a plan view of the rolling mechanism of the apparatus according to the invention for reducing the diameter of a length of glass tubing. FIGURE 19 is a sectional view taken along a line D—D of FIGURE 18. FIGURE 20 illustrates the operation of this rolling mechanism.

Figure 1:
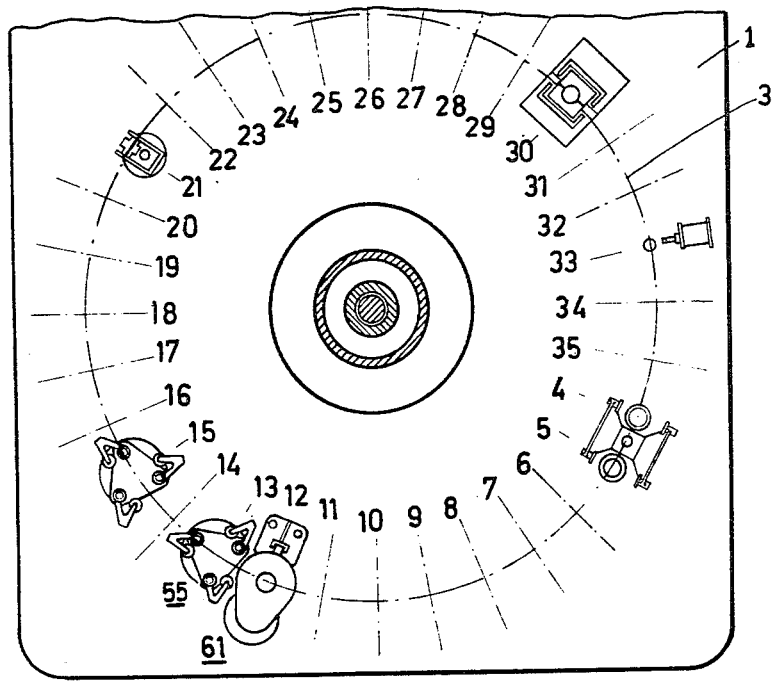
Figure 2:
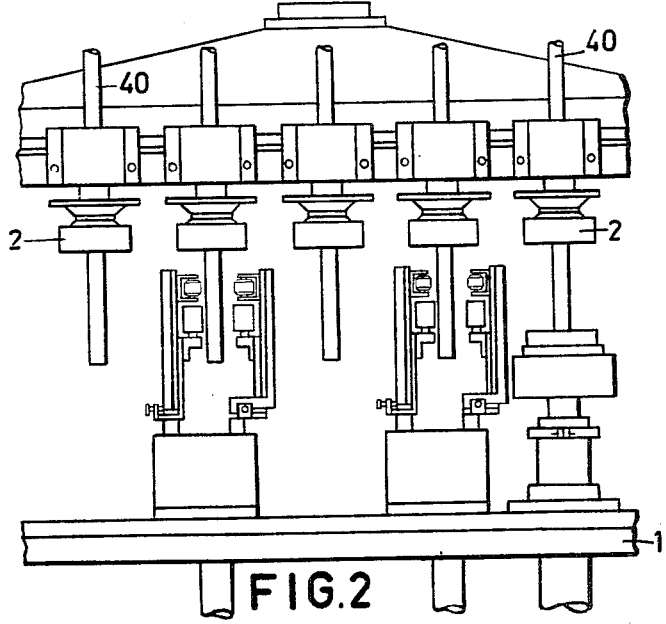

The apparatus of FIGURES 1 and 2 for making glass bulbs from lengths of glass tubing comprises a stationary table 1 over which a number of known holders 2 for gripping glass tubes 40 are arranged. The holders 2 are capable of revolving about their axes and of intermittent movement along a pitch circle 3. The table has a number of positions designated 4 to 35, in each of which the tubes 40 projecting from the holders may be subjected to an operation during a stationary period.

In the positions 6 to 11, 14, 16 to 20 and 22 to 29, burners are disposed which are not shown. Vertically movable members, so-called tube conveyors, are arranged in positions 4 and 5. A drawing-out mechanism, a first shaping roller mechanism and a second shaping roller mechanism are provided in positions 12, 13 and 15, respectively. Members for closing a tube at one end are arranged in position 21. A hollow split bulb mould is disposed in position 30. Positions 31 and 32 are cooling positions. Position 33 comprises a pinching or cutting mechanism. The positions 34 and 35 are reserve positions.

Figure 16:
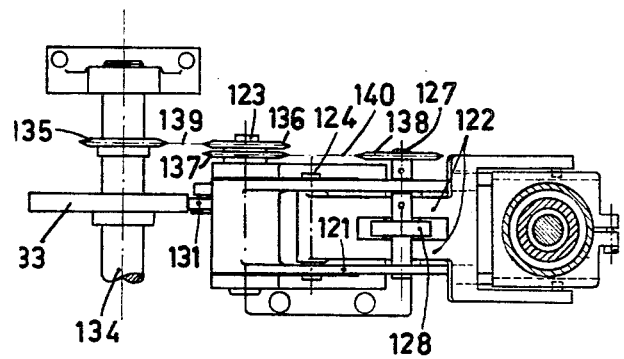

FIGURES 3 to 13 show diagrammatically the operations to which a length of glass tubing held in a rotatable holder can be subjected. FIGURE 3 shows a part 3 of a length of tubing 40 projecting below the rotary holder 2. In the positions 4 and 5 (FIGURES 3 and 4) the tubing 40 can be lowered with respect to the holder 2 by means of a known vertically movable member 53. In FIGURE 5, this member 53 is removed again and a zone 50 of the gripped tubing part 3 is softened by burners provided in positions 6 to 11 (FIG. 1). In FIGURE 6, jaws 114 of a drawing-out mechanism 61 arranged in position 12 (FIG. 1) and described more fully hereinafter in connection with FIGS. 14, 15, 16, grip one end of the tubing 3 and move it axially with respect to the holder 2. As a result the zone 50 (FIG. 5) is drawn out, so that the thickness of the wall of this plastic portion is reduced. By means of a shaping roller mechanism 55 disposed in position 13 of FIGURE 1, the drawn out zone can now be shaped by pressing into it three shaping rollers 63 arranged about the tubing so as to be capable of engaging it. The tubing part thus pre-shaped by these three shaping rollers 63 may again be heated in position 14 by a burner and is then finally shaped, as shown in FIGURE 8, by three rotary shaping rollers 65 likewise disposed about the tubing so as to be capable of engaging it. In the lateral shaping operation shown in FIGURES 7 and 8, the lower end of the tubing is centered by three rotary centering rollers 66 and 67 likewise disposed about the tube so as to be capable of being moved into engagement therewith. Burners arranged in positions 16 to 20 heat the end of the tubing in a manner shown in FIGURE 9. In position 21, means are arranged for closing the lower end of the tubing in known manner. These means comprise two jaws 70 and 71 shown diagrammatically in FIGURE 10. The tubing can be constricted by moving these jaws 70 and 71 towards one another. The closed jaws are then lowered in the direction of length of the tubing with respect to the holder 2, so that the portion 72 situated below the constriction is drawn down and can be removed. The closed length of tubing projecting from the holder 2 is then subjected to heat treatment in positions 22 to 29, as is indicated by arrows in FIGURE 11. The lower end of the tubing is surrounded, in position 30, by a hollow split mould 73, 74 to form it into a bulb 54 (FIGURE 12). In position 33 (FIG. 1) the tubing is provided with a peripheral scratch by a cutting wheel 75 (FIGURE 13), after which by means of a cold fluid applied to the neck of the bulb at the scratch, an annular stress zone is produced at this scratch so that the bulb-shaped portion 54 is severed or detached from the tube 40. Then the situation of FIGURE 3 recurs and the cycle can be repeated.

In this method of manufacturing bulbs from lengths of glass tubing, a tubing portion is first drawn out and subsequently shaped by rolling. This provides control of the wall thickness of the constricted bulb neck, for by rolling alone this thickness would be increased to exceed the initial thickness. By combining this operation with drawing out, the ultimate thickness of the wall of the neck may be maintained or even reduced along the shaped portion as compared with the wall thickness of the initial glass tubing. By the described drawing and rolling operations, the constricted portions of a number of tubings may be given exactly the same diameter and a well-defined wall thickness. Consequently, this constricted portion need not have its shape changed again in the moulding operation shown in FIGURE 12. Thus, to form a finished product as shown in FIGURE 12, it is sufficient to soften only the portion below the constriction by heating as indicated in FIGURE 11. In this method, shaping a bulb 54 having a neck 64 is effected in two stages. The neck portion is definitely shaped in the drawing out and rolling positions and the bulb-shaped portion is formed in a later stage only.

The neck portion of the tubing, which is already shaped definitively in the drawing out and rolling positions, shows an irregular thermal stress image. This stress image is improved by the burners arranged in positions 22 to 29. Especially the heat supply shown in FIGURE 11 contributes to the fact that the neck portion is also heated indirectly and is substantially freed from stresses, i.e., annealed. In these positions 22 to 29, it is ensured that the neck portion assumes a uniform temperature such that upon the formation of the lower tubing portion in the mould (FIGURE 12) this neck portion already has the temperature desired for the subsequent severing operation.

The drawing out mechanism shown in FIGURE 14 for reducing the wall thickness of a tube portion softened by heating, as shown in FIGURE 6, comprises a guiding sleeve 86, which is fixed with respect to the table 1 and in which two co-axially arranged hollow shafts 87 and 88 can slide in bearings 89, 90, 91 and 92. The inner sleeve or tube 88 surrounds a central shaft 95 journalled in bearings 93 and 94. Thus, this shaft 95 together with the sleeve 88 is capable of vertical movement relative to the table 1. A shaft portion 96 of quadratic cross section, which projects downwards, is capable of axial movement relative to a gear-wheel 97 disposed at a fixed level above the base 98 of the machine. This gear-wheel can be driven in any suitable manner (not shown).

The sleeve 88 supports a housing 105, 106 containing a sleeve 109 which is centered by ball bearings 108 and provided with a toothed rim 101. The toothed rim 101 meshes with a pinion 102 secured to the upper end of the shaft 95. By suitable choice of the transmission ratio of these gear-wheels, the sleeve 109 may be made to rotate at the same angular speed as the holder 2. An inner member 110 can slide in the sleeve 109. To the flared or conical upper end of the sleeve 109 there is secured an annular member 115 in which three clamping studs 114, shown in FIGURE 15, are radially slidable. The studs 114 and the conical upper end of the inner member 110 are provided with slots 112 such that by axial upward movement of the inner member 110 relative to the sleeve 109 the studs 114 are moved towards a centre line 113. The inner member 110 is supported in the manner shown by a support 131 which can be vertically moved by means of a lateral projection 130 of the sleeve 87.

The housings (105, 106) and the support 131 are provided with rollers 99 and 100 respectively, which are capable of vertical movement in a guiding cradle 111 rigidly secured to the table 1.

Figure 17:
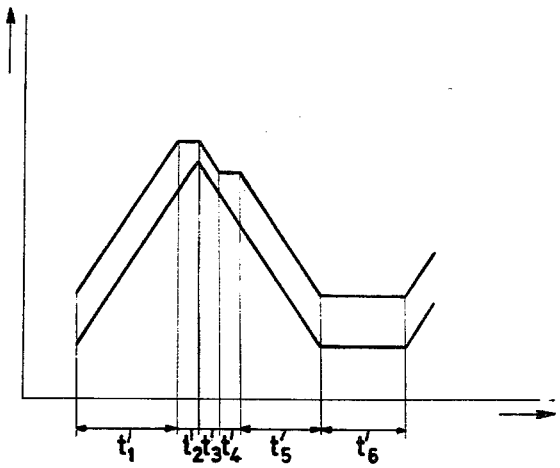
FIGURE 17 illustrates the operation of this drawing mechanism.

The co-axially arranged sleeves 87 and 88, between which a compression spring 120 is enclosed in the manner shown, are supported at their lower ends by forked arms 121 and 122. These arms can pivot about spindles 123 and 124. The arm 121 has a vertical projection 126 in which a spindle 127 bearing a disc-shaped cam 128 is journalled. The arm 122 bears a rotary cam roller 125 which is pressed in continuous engagement with the edge of the cam 128 by the compression spring 120. An arm 130 bearing a rotary cam follower 131 is rigidly connected to the arm 121. The cam follower 131 co-operates with a disc-shaped cam 133 secured to a shaft 134 arranged in a fixed position. Shafts 134, 123 and 127 are provided with chain wheels or sprockets 135, 136, 137 and 138 coupled by chains 139 and 140. The shaft 134 is continuously driven in any suitable manner. The drawing out mechanism shown in FIGURE 14 operates as follows. In the displacement-time diagram of FIGURE 17, the upper and lower curves relate to the vertical movement of the sleeves 88 and 87, respectively. In the non-operative position (shown in FIGURE 14) the housings 105, 106 and the rotary inner member 110 are in a lowermost position. The clamping studs 114 are displaced outwards. In drawing station 12 FIG. 1, the length of tubing 40 projecting from a holder 2 is alined with the centre line 113. By revolving the cam 133, the arms 122 and 121 and hence the co-axially arranged sleeves 87 and 88 are simultaneously raised during a period $t_1$ and the studs 114 are raised to surround the lower end of the tubing 40. By suitable choice of the contours of the cams 133 and 128, the arm 121 is stopped for a short period of time while the arm 122 is pivoted during a period $t_2$, so that the sleeves 87 and 88 are relatively shifted, the compression spring 120 is slightly expanded and the inner member 110 moves upwards relatively to the sleeve 109. As a result, the studs 114 grip the tubing 40 with a pressure determined by the residual spring force of the spring 120. The contours of the cams 133 and 128 are such that on further rotation of the cam 133 the sleeves 87 and 88 move down together. During a period $t_3$, a tensile force downwards is exerted on the softened tubing portion 50 (FIGURE 6) by the clamping studs 114 which move downwards and have an angular speed relative to the centre line 113 which is equal to the speed of the holder 2. By suitable further contouring of the cam 128, the arms 121 and 122 after axial movement can again be moved towards one another during a period $t_4$, so that the jaws 114 are opened again. Finally, the arms 121 and 122 can again be further lowered into their initial positions during a period $t_5$, the drawn out tubing 40 being released. For a period $t_6$, the sleeves 87 and 88 remain in their lowermost positions, while the next tubing to be worked is brought into the drawing position. The length through which the tubing part 50 softened by heating is drawn out in the manner of FIGURE 6, may be adjusted in that the cam 133 either is exchangeable or is designed as a composite cam having a fixed and a variable exchangeable part.

The means shown in FIGURES 18 and 19 for reducing the diameter of a heat-softened and drawn portion of the tubing 40 by lateral rolling comprise a support 140 (FIG. 19) which is mounted on the table 1 and contains a ball bearing 141 in which a central shaft 142 is supported for rotation. A gear-wheel 143 secured to this shaft meshes with three gear-wheels 144 simultaneously. Only one of these gear-wheels 144 is shown in section in FIGURE 19. The support 140 bears a housing 145 in which, viewed in the direction of length of the tubing 40, three shafts 146 can rotate. One of the said gear-wheels 144 is secured to the lower end of each of these shafts. By revolving the central shaft 142, the parts of the shafts 146 projecting from the housing 145 can be each simultaneously revolved through the same angle. Viewed in the direction of length of the tubing 40, this is surrounded by three shaping rollers 147 and three lower centering rollers 148. The upper end of each shaft 146 is a common support for a shaping roller 147 and a lower centering roller 148. These rollers are mounted for rotation in the ends of the arms 149 and 150. The curved arm 149 is rigidly secured to the upper end of the shaft 146 and the arm 150 is mounted for free rotation about the shaft 146 by means of a sleeve 170. A draw spring 151 is stretched between the arms 149 and 150. The upper surface of the housing 145 is provided with three fixed stops 152. Each arm 150 supports adjusting screws 153 and 175.

The operation of the shape-rolling mechnism is as follows (see the diagrammatic arrangements shown in FIGURE 20). In the initial position, the arms 149 and 150 are in the positions shown. When these arms assume positions spaced away from the tubing 40 which are equal for each of the three shafts 146, the tubing suspended from the holder 2 can be moved according to an arrow 176 to the next position without being impeded by the shaping and centering rollers. When, after this movement, a next length of tubing (40) is in exact alinement with the center of the central shaft 142 in the manner shown in FIGURE 19, this central shaft is revolved through a certain angle by means of a cam mechanism (not shown), each shaping roller 147 being moved towards the tubing according to an arrow 162. By the presence of the draw springs 151, the centering rollers 148 will follow this movement. At a certain instant, however, the adjusting screws 153 strike the stops 152, so that on further rotation of the central shaft 142 the shaping rollers 147 alone are moved and laterally pressed into the tubing to a prescribed depth. The adjusting screws 153 are preferably set so that the centering rollers 148 are spaced a small distance from the tubing 40 in their extreme positions. After the shaping operation, the central shaft 142 is revolved back, so that the shaping roller 147 is returned to its initial position. By this movement, the spring 151 is expanded and the adjusting screw 153 is enabled to leave the stop 152, to press the arm 149 to the adjusting screw 175 and to actuate the other arm 150. In FIGURE 20, for the sake of clarity, the centering roller 148 is shown as lagging by a large distance. In actual fact, the rollers 147 and 148 during their common movement according to the arrow 162 are not spaced apart by so large a distance. The spacing between the commonly movable rollers 147 and 148, viewed in the direction of length of the tubing 40, can be adjusted by the adjusting screw 175.

What is claimed is:

1. In a machine for forming glass objects from glass tubing in which said tubing is vertically held in a rotating holder and said holder and associated tube are intermittently moved over an arcuate path into a number of positions wherein an operation is performed on said tube; the improvement comprising means in a first position for locally drawing said tube, means in a succeeding position for centering said tube and radially working said drawn portion and means in a further succeeding position for closing and blow moulding said tube; said first named means comprising a normally open rotatable vertically movable clamp member, means for raising and lowering said clamp member and closing it on the lower end of said tube, a drive means for continuously rotating said clamp member at a determined angular velocity, said means for centering and radially working said locally drawn portion of said tube comprising a first plurality of shaping members including supporting arms, means for pivotally moving said members into engagement with said drawn tube portion, a plurality of offset centering rollers including supporting arms pivotal about the pivoted axis of said first named arms, means resiliently connecting said arms, and stop means for limiting movement of said centering roller arms.

2. In a machine for forming glass objects from glass tubing in which said tubing is held in a rotating holder and said holder and associated tube are intermittantly moved from one position to another over an arcuate path, the improvement comprising, a shaping and centering mechanism secured in at least one of said positions, said mechanism comprising a first plurality of shaping members, a plurality of arms supporting said shaping members, means pivotally supporting said arms for movement between an operative position wherein said shaping members engage said tubing in said one position and an inoperative position wherein said arms are remote from the path of said tube, a second plurality of arms each supporting an offset centering member, means supporting said second plurality of arms for pivotal movement about the pivotal axis of said first plurality of arms, resilient means interconnecting said arms, and stop means operatively connected with said second plurality of arms.

References Cited by the Examiner
UNITED STATES PATENTS

| | | | |
|---|---|---|---|
| 668,223 | 2/1901 | Rudolph | 69—296 X |
| 1,778,743 | 10/1930 | Williams | 65—64 |
| 1,914,205 | 6/1933 | Hopper et al. | 65—105 X |
| 2,101,213 | 12/1937 | Dichter | 65—279 X |
| 2,367,495 | 1/1945 | Gray | 65—279 |
| 2,702,713 | 2/1955 | Brenner | 279—74 |
| 2,935,819 | 5/1960 | Dichter | 65—174 X |

DONALL H. SYLVESTER, *Primary Examiner.*